United States Patent
Ramanathan et al.

(10) Patent No.: US 9,026,580 B2
(45) Date of Patent: May 5, 2015

(54) VALIDATION PIPELINE

(75) Inventors: Premanand Ramanathan, Bellevue, WA (US); Daniel Seefeldt, West Fargo, ND (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1374 days.

(21) Appl. No.: 12/622,492

(22) Filed: Nov. 20, 2009

(65) Prior Publication Data

US 2011/0125827 A1 May 26, 2011

(51) Int. Cl.
*G06F 15/16* (2006.01)
*G06F 21/64* (2013.01)
*G06F 17/30* (2006.01)

(52) U.S. Cl.
CPC ............ *G06F 21/64* (2013.01); *G06F 17/3056* (2013.01)

(58) Field of Classification Search
None
See application file for complete search history.

(56) References Cited

U.S. PATENT DOCUMENTS

| | | | |
|---|---|---|---|
| 6,820,082 B1 * | 11/2004 | Cook et al. | 707/754 |
| 6,915,454 B1 * | 7/2005 | Moore et al. | 714/38.14 |
| 6,973,625 B1 * | 12/2005 | Lupo et al. | 715/762 |
| 7,296,297 B2 * | 11/2007 | Kirkpatrick et al. | 726/30 |
| 7,325,014 B1 | 1/2008 | Kennedy | |
| 7,366,977 B2 * | 4/2008 | Chokshi | 715/209 |
| 7,467,149 B2 | 12/2008 | Gaurav et al. | |
| 7,788,341 B1 * | 8/2010 | Burns | 709/219 |
| 8,244,675 B2 * | 8/2012 | Moore et al. | 707/625 |
| 2002/0095406 A1 * | 7/2002 | Mc George, Jr. | 707/3 |
| 2003/0004951 A1 * | 1/2003 | Chokshi | 707/10 |
| 2003/0093472 A1 * | 5/2003 | Warren | 709/203 |
| 2004/0003057 A1 * | 1/2004 | Broad et al. | 709/219 |
| 2004/0024740 A1 * | 2/2004 | McGeorge, Jr. | 707/1 |
| 2005/0050142 A1 | 3/2005 | Capone et al. | 709/204 |
| 2005/0165776 A1 * | 7/2005 | Focazio et al. | 707/4 |
| 2006/0052945 A1 * | 3/2006 | Rabinowitz et al. | 702/20 |
| 2006/0225032 A1 | 10/2006 | Klerk et al. | |
| 2007/0016960 A1 * | 1/2007 | Glaser et al. | 726/27 |
| 2007/0021955 A1 | 1/2007 | Tolone et al. | |
| 2007/0027847 A1 | 2/2007 | Weinberg et al. | |

(Continued)

FOREIGN PATENT DOCUMENTS

WO WO 0157720 A2 * 8/2001
WO 2009049029 A1 4/2009

OTHER PUBLICATIONS

"Input Validation—An Application Security Perspective" by Prasad Nelabhotla, Mar. 31, 2007.*

(Continued)

*Primary Examiner* — Steven Snyder
(74) *Attorney, Agent, or Firm* — Kevin Sullivan; Kate Drakos; Micky Minhas

(57) ABSTRACT

Techniques for configuring validation rules in a client-server architecture, and for enforcing such validation rules are provided. A developer is enabled to configure a display screen for an application to enable a user at a client to input data. The developer is further enabled to input a validation rule that is configured to be applied to validate the data at the client and/or at a server. The validation rule is integrated into code of the application. During execution of the application, a client-side rules engine may be present to evaluate the validation rule at the client, and a server-side rules engine may be present to evaluate the validation rule at the server. The client-side rules engine and server-side rules engine may be configured to evaluate validation rules in an asynchronous manner.

20 Claims, 12 Drawing Sheets

(56) References Cited

U.S. PATENT DOCUMENTS

| | | | |
|---|---|---|---|
| 2007/0038494 A1 | 2/2007 | Kreitzberg et al. | |
| 2008/0270490 A1* | 10/2008 | Watterott et al. | 707/204 |
| 2008/0271059 A1 | 10/2008 | Ott et al. | 719/328 |
| 2008/0307300 A1* | 12/2008 | Kitayama et al. | 715/234 |
| 2009/0044103 A1* | 2/2009 | Chalecki et al. | 715/234 |
| 2009/0044271 A1* | 2/2009 | Benameur et al. | 726/22 |
| 2009/0164492 A1* | 6/2009 | Cotichini et al. | 707/101 |
| 2009/0171903 A1 | 7/2009 | Lin et al. | |
| 2009/0287617 A1 | 11/2009 | Schmidt | 706/10 |
| 2009/0319881 A1* | 12/2009 | Chokshi | 715/221 |
| 2013/0067308 A1* | 3/2013 | Chokshi | 715/224 |
| 2013/0067309 A1* | 3/2013 | Chokshi | 715/224 |

OTHER PUBLICATIONS

'Module 6: Validating User Input' in Microsoft's msdntraining, copyright 2002.*

'The Essential Guide to Dreamweaver CS4 with CSS, Ajax, and PHP' by David Powers, copyright 2009.*

Apress lising of 'The Essential Guide to Dreamweaver CS4 with CSS, Ajax, and PHP' by David Powers, listing publication date of Nov. 26, 2008.*

'Creating Rich Data Forms in Silverlight—Introduction' by Boyan Mihaylov, Apr. 23, 2009.*

'Create a validation rule to validate data in a field,' copyright 2010 by Microsoft Corporation.*

International Search Report and Written Opinion received for PCT Application No. PCT/US2010/054716, mailed on Jun. 29, 2011, 8 pages.

First Office Action and Search Report Issued in Chinese Patent Application No. 201080052251.4, Mailed Date: Jun. 23, 2014, 18 Pages.

Goedertier, et al., "Rule-Based Business Process Modeling and Execution", Retrieved at <<http://www.econ.kuleuven.be/tew/academic/infosys/Members/Vthienen/PUB/VORTE05/goedertierVORTE2005.pdf>>, Katholieke Universiteit Leuven, 2005, pp. 8.

"WebSphere ILOG Rule Execution Server", Retrieved at <<http://www.ilog.fr/products/jrules/server.cfm>>, IBM Corporation, Sep. 14, 2009, pp. 2.

Second Office Action received for Chinese Patent Application No. 201080052251.4, Mail Date: Feb. 10, 2015, 7 Pages.

* cited by examiner

VALIDATION PIPELINE

BACKGROUND

Business applications are being developed in increasingly greater numbers to increase business productivity. One example type of business application is a line of business (LOB) application. A LOB application is a resource configured to service one or more particular business needs. For example, a LOB system may perform accounting, order processing, supply chain management, resource planning, database management and/or further enterprise-related functions.

Many business applications, including LOB applications, are implemented in client-server computer systems. In such a system, users may interact with the business application at a client computer, and the business application may store related data at a remote database located at the server. A business application may be implemented in a multi-tier (or "n-tier") architecture, where the presentation, application processing, and data management processes are logically separated across the client-server computer system.

Many business applications implement business rules (or "validation rules") that ensure the integrity of data. Enforcing business rules throughout client-server computer systems is a complex issue. Developers of business applications that operate in multi-tier architectures frequently have difficulties in configuring business rules throughout the architecture such that data integrity and data security are enforced.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques for configuring validation rules in a client-server architecture, and for enforcing such validation rules are provided. A developer associates validation rules with data input fields of an application. The validation rules are configured to evaluate data input by users that interact with the application. The validation rules are integrated into the application to be performed at desired points of application execution. During execution of the application, a client-side rules engine may be present to evaluate validation rules at the client, and a server-side rules engine may be present to evaluate validation rules at the server. The client-side rules engine and server-side rules engine may be configured to evaluate validation rules in an asynchronous manner.

In one example implementation, a method in a development tool for client-server applications is provided. A developer is enabled to develop an application. The developer is enabled to configure a display screen for the application to have a user interface element that enables a user at a client to input data to be stored in a database accessible at a server. The developer is enabled to input a rule configured to be applied to validate the data at the client and at the server. The rule is integrated into code of the application.

In another implementation, a method for validation of data in a client-server environment is provided. A user is enabled to execute an application at a client. A display screen of the application is displayed at the client that includes a user interface element capable of receiving data from the user. A first validation of data received by the user interface element is performed at the client according to a client-side rule. A validation error is displayed in the display screen if the data received from the user does not validate according to the client-side rule. The user is enabled to interact with the display screen to attempt to save the data if the data received from the user validates according to the client-side rule. The data is transmitted from the client to the server if the user interacts with the display screen to attempt to save the data. A second validation of the data is performed at the server according to a server-side rule that corresponds to the client-side rule. A validation error is displayed in the display screen if the data received from the user does not validate according to the server-side rule. The data is persisted into a database accessible at the server if the data received from the user does validate according to the server-side rule.

Note that in further implementations, a validation of data input by the user to the display screen may be performed solely by a client-side rule, or solely by a server-side rule, as configured by the developer. Validations of data input by the user may be performed asynchronously, in some implementations.

In still another implementation, a system for validation of data is provided. The system includes an application, a first rules engine, and a second rules engine. The application is configured to execute on a client. The application is configured to display a display screen at the client that includes a user interface element capable of receiving data from the user. The first rules engine is configured to execute on the client, and is configured to perform a first validation at the client of data received by the user interface element according to a client-side rule. The second rules engine is configured to execute at a server. The application is configured to display a validation error in the display screen if the first rules engine indicates that the data does not validate according to the client-side rule. The application is configured to enable the user to attempt to save the data if the data received from the user validates according to the client-side rule. The data is transmitted from the client to the server if the user attempts to save the data. The second rules engine is configured to perform a second validation at the server of the data according to a server-side rule that corresponds to the client-side rule. The application is configured to display a validation error in the display screen if the data does not validate according to the server-side rule. The data is persisted into a database accessible at the server if the data does validate according to the server-side rule.

Computer systems and computer program products (stored on a computer readable medium) are also described herein that are capable of performing and/or enabling the methods described above and elsewhere herein, including configuring validation rules in a client-server architecture, enforcing such validation rules, and for implementing further embodiments as described herein.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
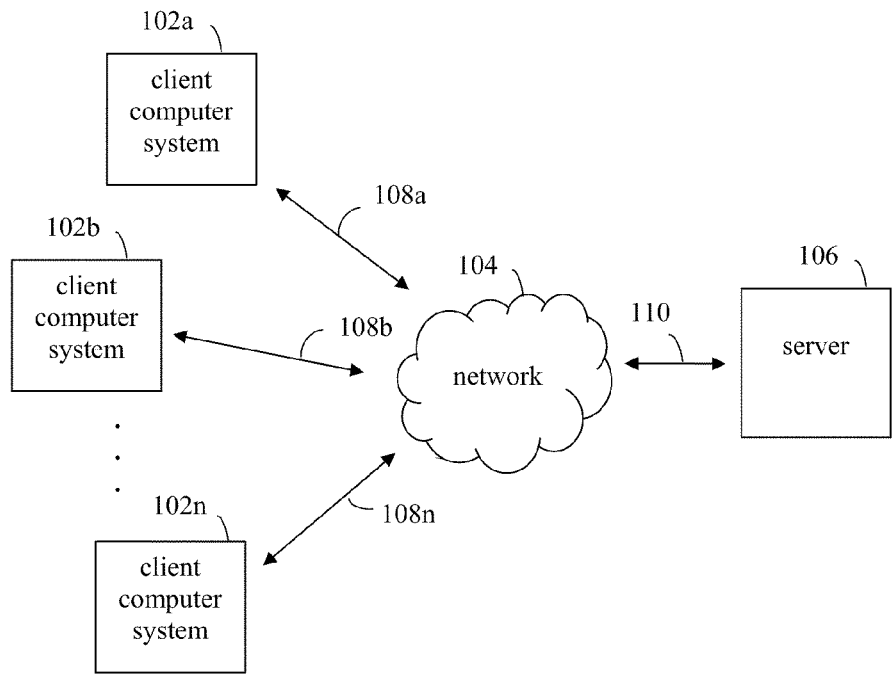
FIG. 1 shows a block diagram of a client-server computer system.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

II. Example Embodiments

Embodiments are provided herein for configuring business rules in a client-server architecture, and for enforcing such business rules. Business applications, such as line of business (LOB) applications, may perform many types of tasks, including accounting, order processing, supply chain management, resource planning, database management and/or further enterprise-related functions. Such business applications need to enforce business rules to ensure the integrity of data that is input by users at client devices. Embodiments described herein enable business rules to be configured and enforced in various business application implementations, including multi-tier architecture ("n-tier architecture") implementations.

For example, according to embodiments, business rules are enabled to be enforced on the client and on the server. In an embodiment, the business rules are analyzed to determine whether they are applicable to be enforced on the client(s) and/or on the server. The business rules are allocated to the client(s) and server for enforcement according to this determination. Furthermore, business rules allocated to the client may be positioned in the business application at one or more locations of the application code to be enforced at desired points of application execution. Such allocations may be performed for the application developer, rather than the developer having to make such allocations.

In conventional systems, when business rules are in place, execution of such business rules tends to follow a synchronous mode, where data that is input by a user at a client triggers validation according to the business rules at that point in time. As such, the user interface that receives the input data may become unresponsive to the user while the business rules are being evaluated. In embodiments, validation rules are enabled to be executed in an asynchronous manner so that the user interface can be responsive while validation rules are being evaluated. For example, a rules engine may be provided at the client and/or at the server to perform asynchronous evaluation of validation rules. In further embodiments, alternatively to synchronous/asynchronous modes, one or more policies for execution of validation rules may be configured by an application developer. For example, a developer may configure a policy to enable validation rules to be executed when the application enters an idle state, to execute validation rules on added entities after a save is performed, and/or in any other desired manner.

As described above, embodiments may be implemented in a client-server computing environment. For example, FIG. 1 shows a block diagram of a client-server computer system 100. As shown in FIG. 1, system 100 includes a plurality of client computer systems 102a-102n, a network 104, and a server 106. Client computer systems 102a-102n communicate with server 106 through network 104. Network 104 may be a LAN (local area network), a WAN (wide area network), or a combination of networks, such as the Internet. Any number of one or more of client computer systems 102a-102n may be present, including numbers in the tens, hundreds, etc. Examples of client computer systems 102a-102n include desktop computers (e.g., personal computers), mobile computing devices (e.g., mobile computers such as a personal digital assistant (PDA), a laptop computer, a notebook computer, etc.), mobile phones (e.g., smart phones, etc.) and further computing device types.

Each client computer system 102 and server 106 may communicate through network 104 according to a corresponding communication link. For example, as shown in FIG. 1, client computer systems 102a-102n are communicatively coupled with network 104 through corresponding communication links 108a-108n, and server 106 is communicatively coupled with network 104 through a communication link 110. Communication links 108a-108n and 110 may include any type or combination of communication links, including wired and/or wireless links, such as IEEE 802.11 wireless LAN (WLAN) wireless links, cellular network links, wireless personal area network (PAN) links (e.g., Bluetooth™ links), Worldwide Interoperability for Microwave Access (Wi-MAX) links, Ethernet links, USB links, etc.

Server 106 may be any type of computer system capable of being configured to function as a server, as described elsewhere herein or otherwise known. Server 106 may be configured to enable client computer systems 102a-102n to access data associated with one or more applications. Client computer systems 102a-102n may interface with server 106 in any manner. For example, in one embodiment, server 106 may provide a web service or other API (application programming interface) for machine-to machine interaction with client computer systems 102a-102n. In a Web service embodiment, client computer systems 102a-102n may interact with the Web service at server 106 using SOAP messages, typically conveyed using HTTP with an XML serialization in conjunction with other Web-related standards.

Figure 2:
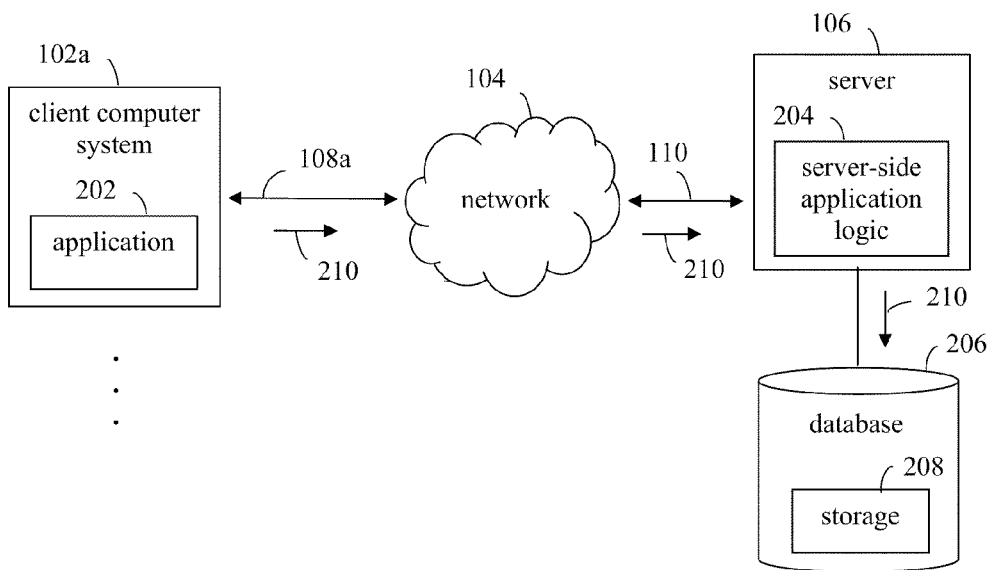
FIG. 2 shows a portion of the client-server computer system of FIG. 1, further including a database.

FIG. 2 shows a portion of system 100 of FIG. 1, where a database 206 is coupled to server 106. In FIG. 2, client computer system 102a is shown executing an application 202 that is configured to interact with data maintained by database 206 through server 106. As shown in FIG. 2, database 206 may include storage 208 configured to store data. Storage 208 may include one or more of any suitable type of storage device, including a magnetic disc (e.g., in a hard disk drive), an optical disc (e.g., in an optical disk drive), a magnetic tape (e.g., in a tape drive), a memory device such as a RAM device, and/or any other suitable type of storage medium.

Application 202 may be any type of business application, and may be capable of storing new data, updating existing data, and/or deleting data maintained by database 206. For instance, a user of application 202 may enter data into a form provided by a user interface at client computer system 102a. The data may be any type of data, such as order data (e.g., where application 202 is an order processing application), etc. Application 202 may optionally process the entered data, and client computer 102a transmits the entered data as input data 210. Input data 210 is transmitted through network 104 to server 106. Server 106 may optionally include server-side application logic 204 associated with application 202 that processes input data 210. Server 106 provides input data 210 to database 206, which stores input data 210 in storage 208.

Figure 3:
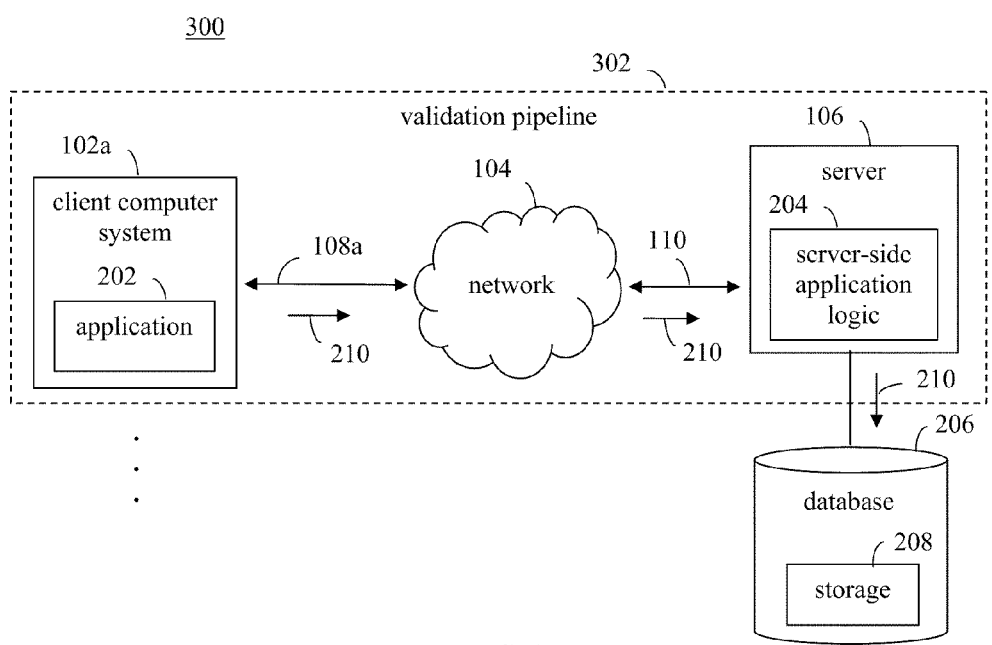
FIG. 3 shows a block diagram of a client-server computer system configured with a validation pipeline, according to an example embodiment.

As described above, it may be desired for applications to enforce rules that ensure data integrity, including the integrity of data that is input by users, such as input data 210. Embodiments are described herein for configuring business rules in a client-server architecture, such as shown in FIGS. 1 and 2, and for enforcing such business rules. For instance, FIG. 3 shows a block diagram of a client-server computer system 300, according to an example embodiment. Client-server computer system 300 is generally similar to client-server computer system 100 of FIGS. 1 and 2, with the addition of a validation pipeline 302. Validation pipeline 302 enables the validation of data in system 100 according to developer-generated rules, including validation of data at client computer systems 102a-102n and at server 106.

In an embodiment, validation pipeline 302 enables validation rules to be positioned in various locations in the client-server environment for specific scenarios and requirements. For instance, in a multi-tier architecture embodiment, validation pipeline 302 may define where in the logical tier that validation rules may be executed, such as the client, the server, or both the client and server, as well as enabling validation rules to be associated with various artifacts, such as entity fields, entities, and display screens. Validation pipeline 302 enables validation rules to be executed asynchronously, including being executed outside of the process of receiving data input from the end user.

Example embodiments for validation pipeline 302 are described in the following subsections. The next subsection describes example embodiments for configuring business rules in a client-server architecture, followed by a subsection describing example embodiments for enforcing such business rules in a client-server architecture.

A. Example Embodiments for Configuring a Validation Pipeline

Figure 4:
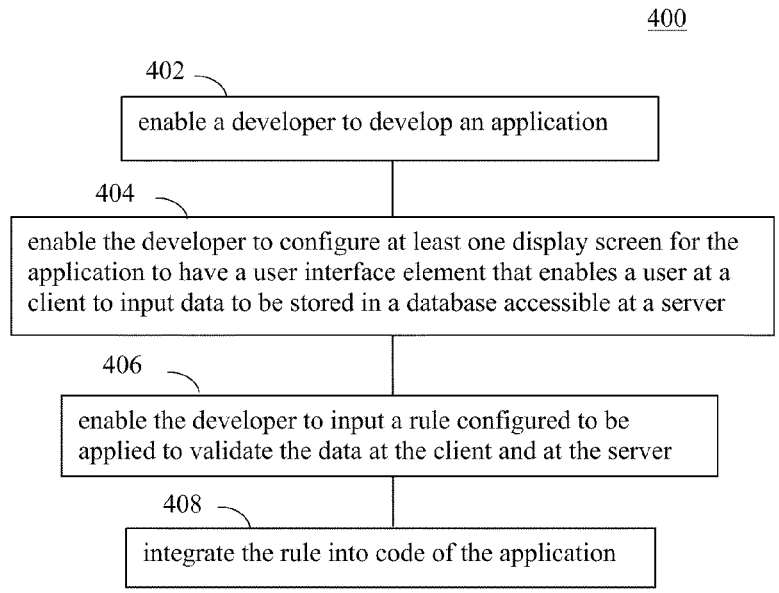
FIG. 4 shows a flowchart providing a process for configuring rules in a client-server architecture, according to an example embodiment.
Figure 5:
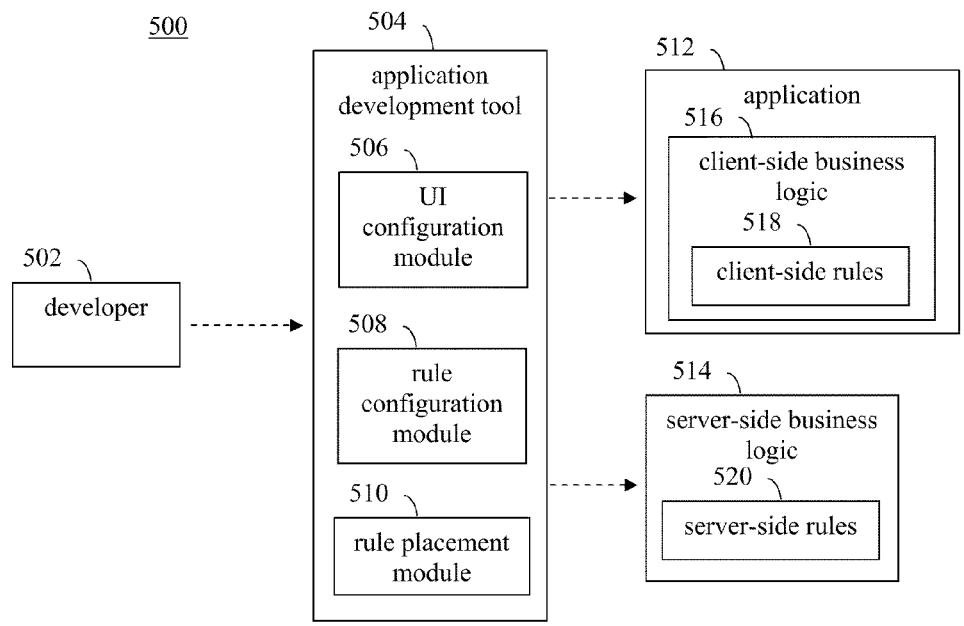
FIG. 5 shows a block diagram of a system for configuring validation rules, according to an example embodiment.

Validation pipelines may be configured in client-server architectures in various ways to enable the validation of data according to rules, in embodiments. For instance, FIG. 4 shows a flowchart 400 providing a process for configuring rules in a client-server architecture, according to an example embodiment. For illustrative purposes, flowchart 400 is described with reference to FIG. 5. FIG. 5 shows a block diagram of a system 500 for configuring validation rules, according to an example embodiment. Further structural and operational embodiments will be apparent to persons skilled in the relevant art(s) based on the discussion regarding flowchart 400. Flowchart 400 and system 500 are described as follows.

Flowchart 400 begins with step 402. In step 402, a developer is enabled to develop an application. For example, as shown in FIG. 5, system includes an application development tool 504. Application development tool 504 is configured to enable a developer 502 (e.g., a business application designer, a software developer, a computer programmer, etc.) to develop an application, such application 202 shown in FIG. 2. Application development tool 504 may be configured to enable development of one or more business application aspects, including user interface (UI) development, application functionality, etc.

Application development tool 504 may be any suitable application development tool, commercially available or proprietary, in which aspects of embodiments described herein may be implemented. Examples of application development tool 504 include application development tools published by Microsoft Corporation of Redmond, Wash. (e.g., Microsoft Visual Studio®, Microsoft Silverlight™, etc.), application development tools published by Adobe Systems Inc. of San Jose, Calif. (e.g., Adobe Integrated Runtime (AIR)), Ruby on Rails (developed by the Rails Core Team), and further types of application development tools.

In step 404, the developer is enabled to configure at least one display screen for the application to have a user interface element that enables a user at a client to input data to be stored in a database accessible at a server. For example, as shown in FIG. 5, application development tool 504 may include a user interface (UI) configuration module 506, a rule configuration module 508, and a rule placement module 510. UI configuration module 506 may be configured to enable developer 502 to configure display screens for an application in development. For instance, UI configuration module 506 may enable developer 502 to generate one or more forms that enable a user to input data to the application. The input data may be intended to be stored in database 206 (FIG. 2) by the application, when executing/

Figure 6:
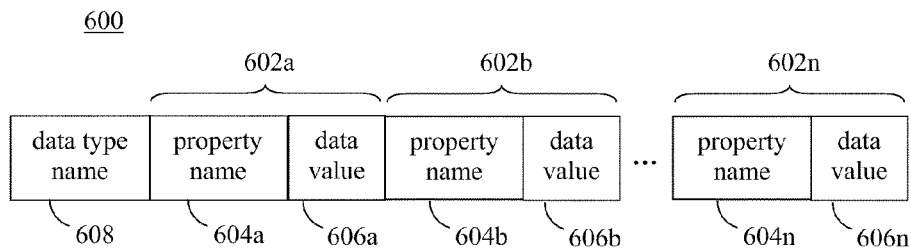
FIG. 6 shows a block diagram of an example data structure.

UI configuration module 506 may enable developer 502 to generate display screens for receiving any type or form of data, including data structures such as objects, classes, etc. For example, FIG. 6 shows a block diagram of an entity 600, which is an example of data that may be received, and that may include one or more properties. Entity 600 has an entity name 608, such as "Employee" (e.g., when the entity is used to represent employee data) or other name, which may be descriptive of a structure of the included data. As shown in FIG. 6, entity 600 has a structure defined by a set of properties 602a-602n. Entity 600 may include one or more properties 602. As shown in FIG. 6, properties 602a-602n are each expressed as a name/value pair, each name/value pair including a corresponding property name 604 and a data value 606. Data value 606 may include a value and an associated type (e.g., integer, string, date, etc.)). For example, property 602a includes a property name 604a and a data value 606a, and property 602b includes a property name 604b and a data value 606b. Each property name 604 has a value that is a name for the corresponding property 602, and the corresponding data value 606 is a data value for the property 602 in entity 600. For instance, in an example where entity name 608 for entity 600 is "employee," property name 602a may be "name," and data value 602b may be "Tom Smith," property name 602b may be "birth date," and data value 602b may be "1976-08-27," and a property name 602c may be "office number," and data value 602c may be "B1078."

Figure 7:
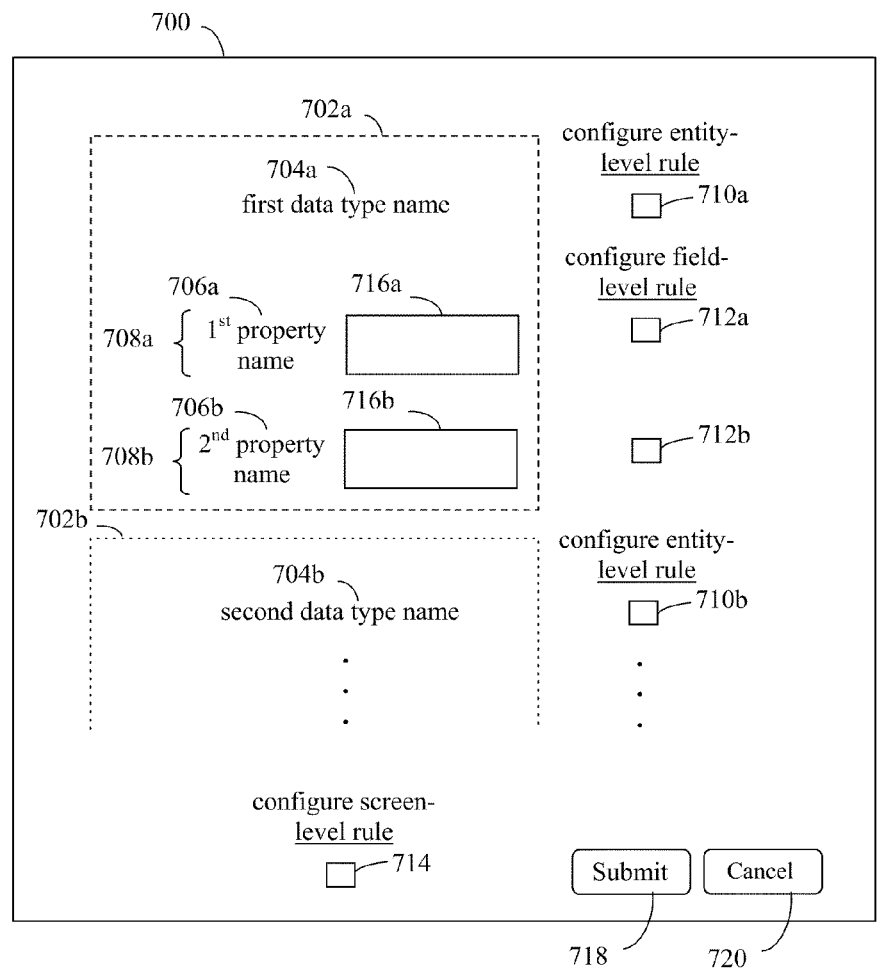
FIG. 7 shows a display screen in development, according to an example embodiment.

UI configuration module 506 may enable developer 502 to generate display screens for receiving any type or form of data, including entity 600. For instance, FIG. 7 shows a display screen 700 in the process of development by developer 502 interacting with UI configuration module 506 of tool 504 in FIG. 5, according to an example embodiment. A developer may configure user interface elements (e.g., "controls") for receiving data to be present in display screen 700. As shown in FIG. 7, the developer has configured a first entity region 702a for receiving data corresponding to a first entity, and a second entity region 702b for receiving data corresponding to a second entity. Each entity region 702 is configured to enable a user to input property data for the corresponding entity. First entity region 702a includes first and second entity field regions 708a and 708b for receiving associated property data corresponding to the first entity. In an embodiment, UI configuration module 506 may enable the developer to position entity regions 702 and entity field regions 708 in display screen 700, as desired.

Display screen 700 may be configured by the developer to include any number of entity regions 702 corresponding to entities, and each region 702 may include any number of entity field regions 708 for receiving data corresponding to entity fields. Entity regions 702 may be arranged in display screen 700 in any manner, and corresponding entity field regions 708 may be arranged therein in any manner. Each entity region 702 may be configured to include an entity label 704, which identifies the particular entity to a user. For example, entity region 702a may be configured by the developer to enable users to enter employee data, and thus, in such an example, entity label 704 may be the text "Employee."

Entity field regions 708 may be configured to include any type of user interface element or control that enables data to be entered by a user, such as text entry boxes, etc. For example, as shown in FIG. 7, each entity field region 708 includes a field label 706 and a text entry box 716. Field label 706 identifies the particular entity field. For example, when entity region 702a is configured by the developer to receive employee data, field label 706a may be the text "Name," (so that a user knows to enter employee name data into text entry box 716a) and field label 706b may be the text "Birth date" (so that the user know to enter a birth date for the employee in text entry box 716b).

Entity regions 702 and entity field regions 708 may be configured to enable new data to be provided to database 206, existing data to be updated in database 206, and/or existing data to be deleted from database 206. When the developer has completed configuring display screen 700 as desired, the developer may select a save button 718 ("Submit") to save the configuration of display screen 700, or may select a cancel button 720 (to not save any changes to display screen 700).

Referring back to FIG. 4, in step 406, the developer is enabled to input a rule configured to be applied to validate the data at the client and at the server. For example, as shown in FIG. 5, rule configuration module 508 may enable developer 502 to configure validation rules with regard to the application in development. Rule configuration module 508 may enable developer 502 to generate one or more rules for each entity field and/or entity of a display screen, as well as for the display screen itself. For instance, rule configuration module 508 may generate a rule configuration interface that enables users to input validation rules. Rule configuration module 508 may generate business logic based on the input validation rules that may be executed to perform validations according to the input validation rules.

As described above, a developer is enabled to configure display screen 700 to include interfaces/controls for receiving data (by UI configuration module 506 of FIG. 5) in the form of entities and entity fields. Furthermore, for each entity and entity field, the developer may be enabled to configure associated validation rules by rule configuration module 508. Rule configuration module 508 may be configured to enable the rules to be input by the developer in various ways. For instance, as shown in FIG. 7, user interface elements may be provided that the developer can select if the developer desires to input validation rules. For instance, for each entity region 702 that is input into display screen 700 by the developer, a corresponding user interface element 710 may be provided. For each entity field region 708 input into display screen 700 by the developer, a corresponding user interface element 712 may be provided. Furthermore, a user interface element 714 corresponding to display screen 700 may also be provided. User interface elements 710 may be interacted with by the developer to invoke a rule configuration interface that enables a corresponding rule to be input associated with the respective entity region 708 (an entity-level rule). User interface elements 712 may be interacted with the developer to invoke the rule configuration interface that enables the developer to input a rule associated with the respective entity field region 708 (an entity field-level rule). User interface element 714 may be interacted with by the developer to invoke the rule configuration interface to enable a rule to be input that is associated with display screen 700 (a screen-level rule).

For example, as shown in FIG. 7, entity region 702a has a corresponding user interface element 710a, entity field 708a has a corresponding user interface element 712a, entity field 708b has a corresponding user interface element 712b, and entity region 702b has a corresponding user interface element 710b. User interface elements 710, 712, and 714 are shown in FIG. 7 as buttons (e.g., that may be selected using a pointing device, keystrokes, etc.), but in other embodiments may have other forms. User interface elements 710, 712, and 714 may be selected to invoke the rule configuration interface for the corresponding entity, entity field, or display screen. In another embodiment, rather than user interface elements 710, 712, and/or 714 being present, a developer may move a pointing device over an entity region 702, entity field region 708, or a region of display screen 700, and may cause a menu to appear (e.g., by clicking using the pointing device) that has a "configure rule" selection, or similar selection, that may be selected to invoke a rule configuration interface to enable a rule to be entered by the developer. In further embodiments, a rule configuration interface may be invoked for an entity, an entity field, and a display screen in other ways.

Figure 8:
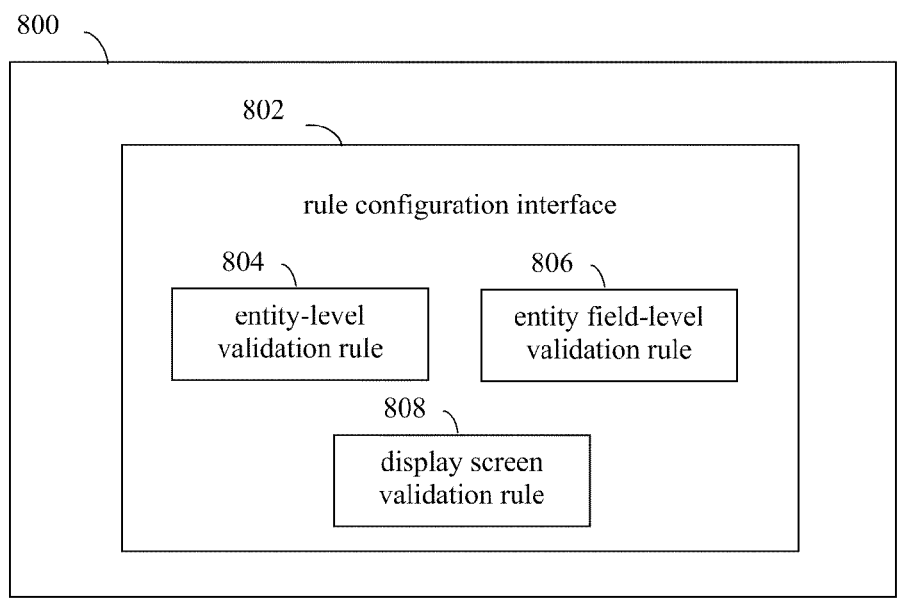
FIG. 8 shows a block diagram of a user interface that includes a rule configuration interface, according to an example embodiment.

For example, FIG. 8 shows a block diagram of a user interface 800 (e.g., a display screen) that includes a rule configuration interface 802, according to an example embodiment. Rule configuration interface 802 may be invoked to configure a validation rule 804 for an entity, a validation rule 806 for an entity field, and/or a validation rule 808 for a display screen. Rule configuration interface 802 may include any combination of user interface elements or controls, including text entry boxes, check boxes, radio buttons, drop-down lists, etc., that enable a validation rule 804 to be entered/configured. Rule configuration interface 802 may enable configuration of validation rules in any manner, including enabling rules to be configured to validate data parameters such as length, range, various types of information, type, etc. Standard, predetermined "validators" may be provided, and/or developers may be enabled generate customized validation configurations.

Validation rules 804, 806, and 808 of any type may be configured using rule configuration interface 802. For instance, with regard to an entity field (e.g., an entity field region 708), validation rule 804 may be configured to evaluate the correctness or acceptability of the data input into the entity field. Examples of attributes of the data input that may be evaluated by validation rule 804 include data type, length, range, format, etc. For instance, in one example, entity field region 708*b* may be configured by a developer to receive birth date data. Validation rule 804 may be configured to verify that a birth date input to entity field region 708*b* corresponds an acceptable age range (e.g., an age that is greater than or equal to 21 years old).

With regard to an entity (e.g., an entity region 702), validation rule 806 may be configured to ensure that an entity instance is in the valid state. For example, validation rule 806 may be configured to as a cross-field validation rule to ensure that data entered into a first entity field is correct relative to data entered into a second entity field of an entity. Furthermore, validation rule 806 may be configured as a cross-entity validation rule that accesses related entities and evaluates data across the related entities. For instance, in a cross-field validation rule example with respect to entity region 702*a*, entity field region 708*a* may be configured to receive phone number data, and entity field region 708*b* may be configured to receive office number data. Validation rule 806 may be configured to verify that a phone number input to entity field region 708*a* corresponds to an office number input to entity field region 708*b*.

With regard to a display screen (e.g., display screen 700), validation rule 808 may be configured to perform screen level validation. For instance, a display screen may have access to bound entities as well as any other screen level members (e.g., screen text, etc.). Validation rule 808 may be configured to evaluate data across screen level members to ensure that the display screen as a whole is in a valid state, and that a save operation (e.g., selecting save button 718 in FIG. 7) from the display screen can be executed.

As mentioned above, rule configuration module 508 converts each of the rules input by developer 502 (e.g., into rule configuration interface 802) into business logic that may be executed to enforce the rules on entered data.

Referring back to FIG. 4, in step 408, the rule is integrated into code of the application. For example, as shown in FIG. 5, rule placement module 510 may be configured to integrate validation rules into an application. For example, as shown in FIG. 5, application development tool 504 generates an application 512. Application 512 may include application functionality configured by developer 502 using application development tool 504, including any display screens configured by developer 502. Furthermore, as shown in FIG. 5, application 612 may include client-side business logic 516. Client-side business logic 516 is generated by rule configuration module 508 to implement client-side rules 518. Client-side rules 518 includes one or more validation rules input by developer 502 (in step 406) that are determined by rule placement module 510 to be implemented by a client in a client-server implementation. As shown in FIG. 5, application development tool 504 additionally generates server-side business logic 514. Server-side business logic 514 is generated by rule configuration module 508 to implement server-side rules 520. Server-side rules 520 includes one or more validation rules input by developer 602 (in step 406) that are determined by rule placement module 510 to be implemented by the server in a client-server implementation.

Note that client-side business logic 516 and server-side business logic 514 may be implemented in any manner, including in the form of computer code in any programming language. Examples of programming languages for client-side business logic 516 and server-side business logic 514 include XML, C++, Borland® Delphi®, Java, JavaScript, Python, any Microsoft®.NET™ programming language, etc.

Figure 9:
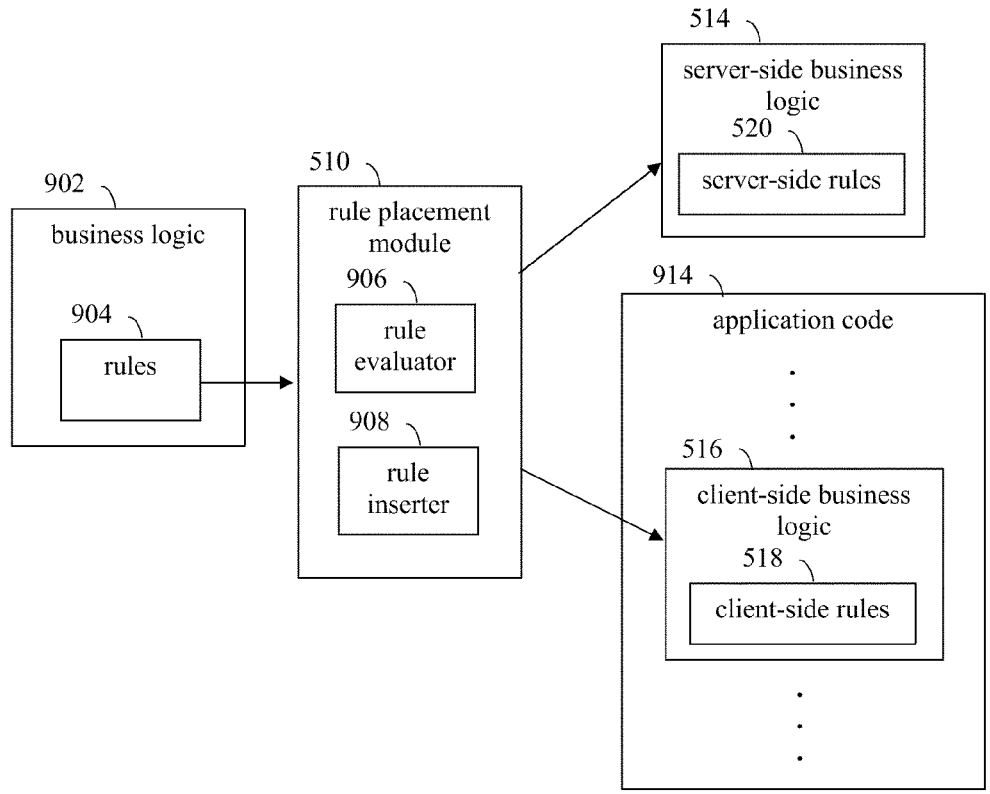
FIG. 9 shows a block diagram of a rule placement module, according to an example embodiment.

FIG. 9 shows a block diagram of rule placement module 510, according to an example embodiment. As shown in FIG. 9, rule placement module 510 includes a rule evaluator 906 and a rule inserter 908. As shown in FIG. 9, rule placement module 510 receives business logic 902. Business logic 902 is generated by rule configuration module 508 (FIG. 5) to implement validation rules 904 input by a developer (e.g., using rule configuration interface 802). Rule evaluator 906 receives business logic 902, and evaluates which business logic corresponding to validation rules 904 is to be executed on the client-side and/or is to be executed on the server-side. For example, business logic corresponding to a validation rule that can be completely executed on the client-side (e.g., does not require data/resources from a remote source, has a complexity level low enough to be performed on the client, etc.) is designated by rule evaluator 906 to be executed on the client-side. Business logic corresponding to a validation rule that cannot be completely executed on the client-side (e.g., requires data/resources from a remote source, has a complexity level high enough that it should be performed on the server, etc.) is designated by rule evaluator 906 to be executed on the server-side.

Thus, in some embodiments, business logic for a particular validation rule may be designated to be executed on the client-side or on the server-side, but not both. In another embodiment, it may be desired for each validation rule designated for execution on the client-side to also be executed on the server-side. For instance, for purposes of security, it may be desired that all validation rules be executed on the server-side, including validation rules designated for execution on the client-side, to protect the database at the server from data accesses from unknown parties. Thus, in an embodiment, each validation rule designated for execution on the client-side is also designated for execution on the server-side. In such a case, data entered at a client may be validated first at the client, and again at the server.

Rule placement module 510 generates client-side business logic 516, which includes client-side rules 518, to include portions of business logic 902 corresponding rules 904 designated to be executed on the client-side. Rule placement module 510 generates server-side business logic 514, which includes server-side rules 520, to include portions of business logic 902 corresponding rules 904 designated to be executed on the server-side.

Rule inserter 908 is configured to insert client-side business logic 516 in application code 914 corresponding to application 512 (FIG. 5). Rule inserter 908 inserts business logic corresponding to each validation rule of client-side rules 518 into a corresponding position in application code 914 such that the validation rule is executed at an appropriate time. As such, the developer that input the validation rules (e.g., developer 502 in FIG. 5) does not need to determine where to insert the validation rules in application code 914, because rule inserter 908 automatically inserts the validation rules (in the form of business logic) into appropriate positions in application code 914.

Figure 10:
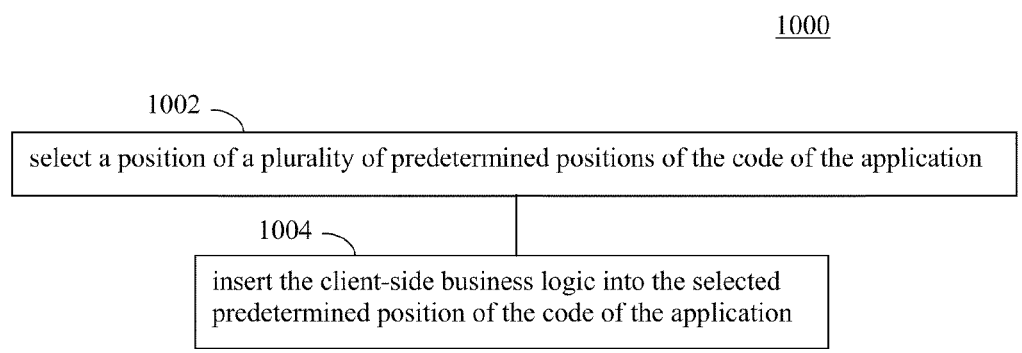
FIG. 10 shows a flowchart providing a process for inserting business logic corresponding to validation rules into an application, according to an example embodiment.

For example, in an embodiment, rule inserter 908 may perform flowchart 1000 shown in FIG. 10. In step 1002, a position of a plurality of predetermined positions of the code of the application is selected. A plurality of positions in application code 914 may be predetermined as being suitable for executing client side rules 518 (in the form of client-side business logic 516). Examples of such positions in application code 914 include a position subsequent to code for receiving input data in an entity field control, a position subsequent to code for receiving all data in all fields for an entity, a position subsequent to a user attempting to save (e.g., selecting save button 718) a display screen, a position after or before a display screen is rendered, and/or further positions in application code 914. Rule inserter 908 may be configured to select a position from these predetermined positions in application code 914, based on the particular validation rule.

For example, a validation rule may be associated with a particular entity field that is not dependent on any other entity fields or entities. In such a case, rule inserter 908 may select a code position in application code 914 that is subsequent to code for receiving data in the entity field to insert the associated business logic. Alternatively, a validation rule may be associated with an entity having multiple entity fields. In such a case, rule inserter 908 may select a code position in application code 914 that is subsequent to code that determines that data has been received in each entity field of the entity to insert the associated business logic.

In step 1004, the client-side business logic is inserted into the selected predetermined position of the code of the application. In an embodiment, rule inserter 908 may insert the client-side business logic in the position in application code 914 selected in step 1002 for the particular validation rule. If multiple validation rules are present, business logic for each validation rule may be inserted into a corresponding selected position in application code 914.

Thus, as shown in FIG. 5, application development tool 504 generates an application 512 that has client-side business logic 516 (that implements client-side rules 518) inserted therein, and generates server-side business logic 514 that implements server-side rules 520. Application 512 may be executed on a client by a user (e.g., client computer system 102a of FIG. 2), and server-side business logic 514 may be implemented on the corresponding server (e.g., server 106) to validate data in a validation pipeline.

Figure 11:
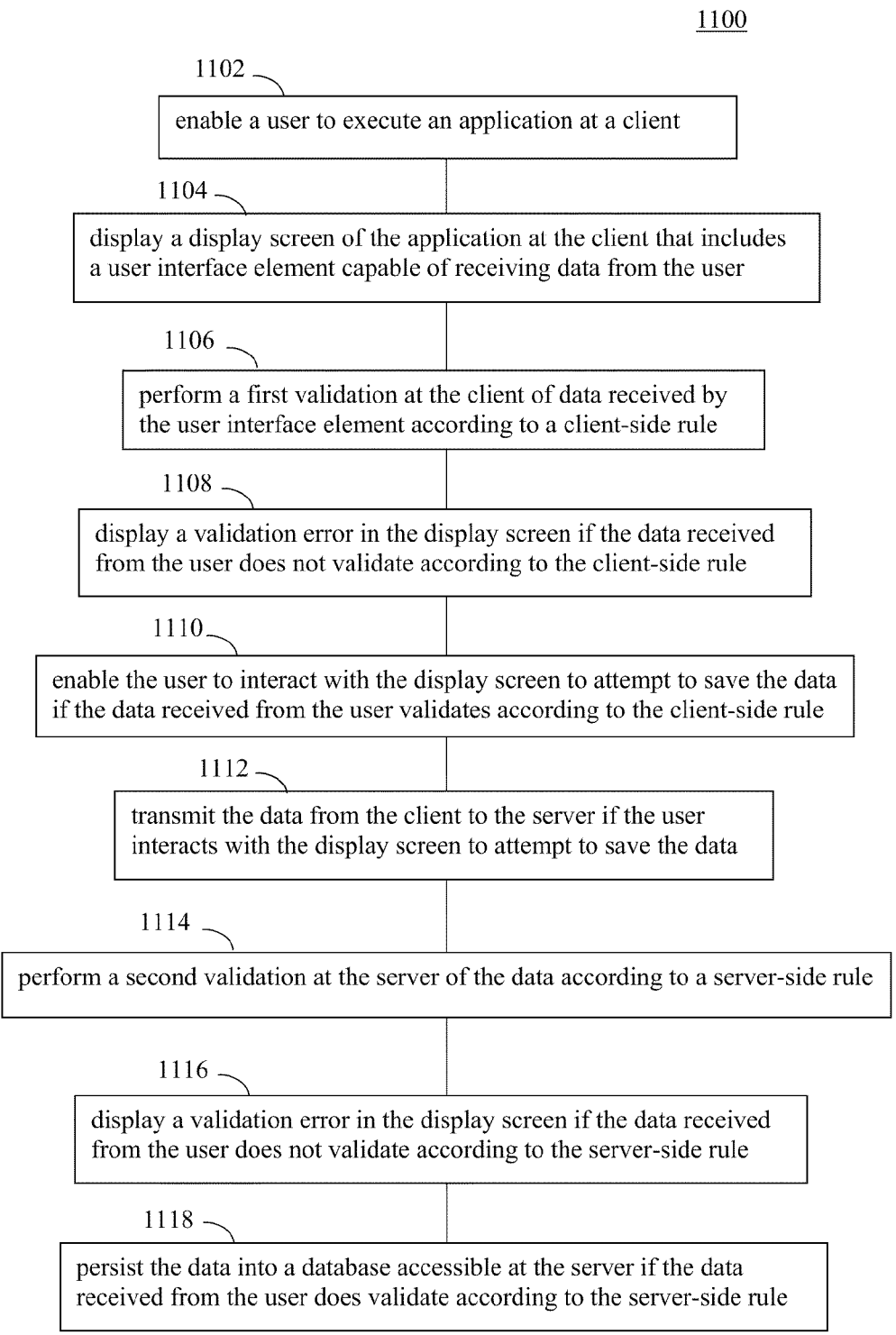
FIG. 11 shows a flowchart providing a process for enforcing validation rules in a client-server architecture, according to an example embodiment.
Figure 12:
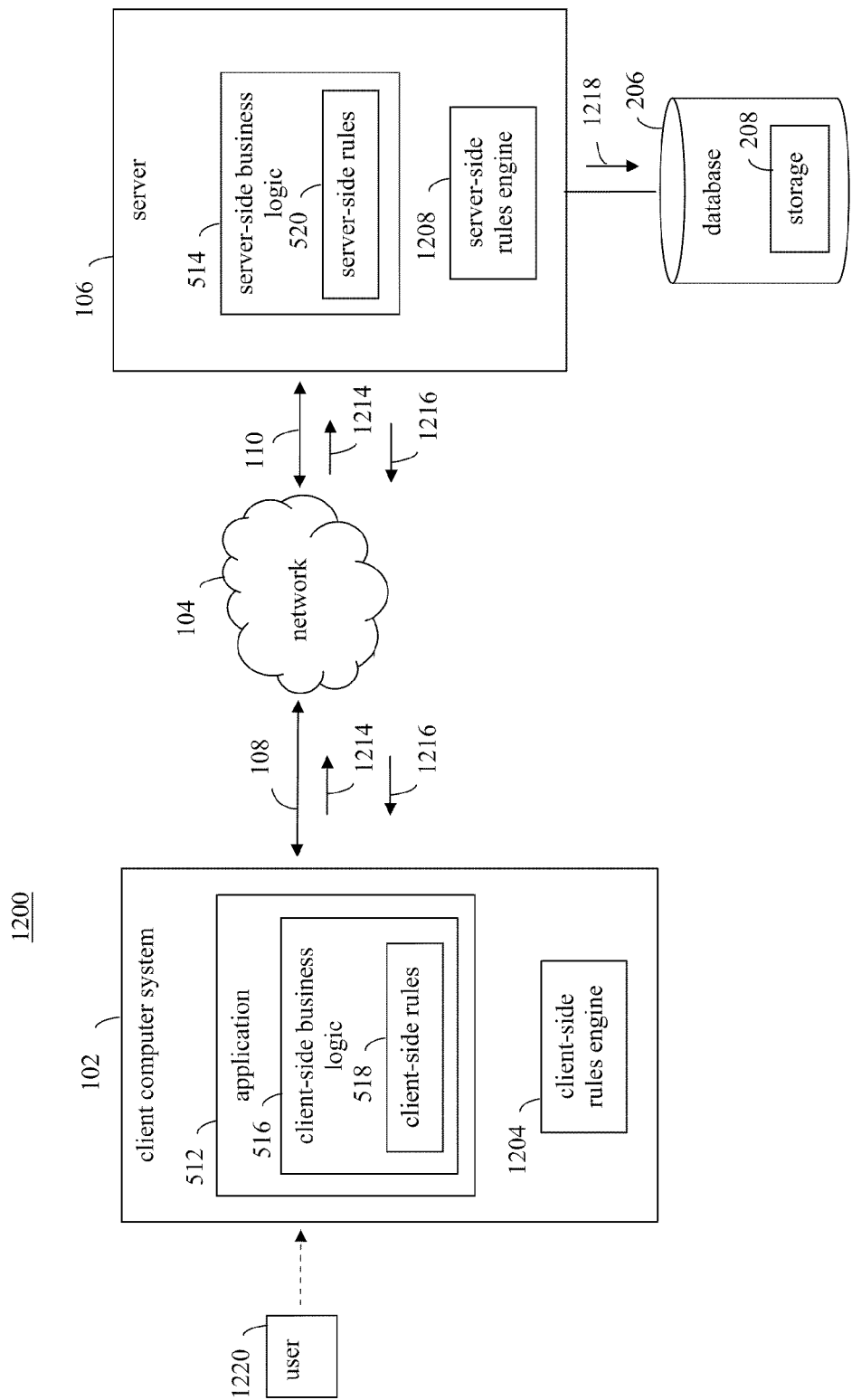
FIG. 12 shows a block diagram of a client-server computer system, according to an example embodiment.

B. Example Embodiments for Enforcing Validation Rules in a Client-Server Architecture This subsection describes embodiments for enforcing validation rules in a client-server architecture, such as client-server computer system 100 shown in FIGS. 1 and 2. For instance, FIG. 11 shows a flowchart 1100 providing enforcing rules in a client-server architecture, according to an example embodiment. For illustrative purposes, flowchart 1100 is described with reference to FIG. 12. FIG. 12 shows a block diagram of a client-server computer system 1200, according to an example embodiment. As shown in FIG. 12, system 1200 includes a client computer system 102, network 104, server 106, and database 206. Client computer system 102 includes application 512 and a client-side rules engine 1204. Server 106 includes server-side business logic 514 and a server-side rules engine 1208. Further structural and operational embodiments will be apparent to persons skilled in the relevant art(s) based on the discussion regarding flowchart 1100. Flowchart 1100 is described as follows.

Flowchart 1100 begins with step 1102. In step 1102, a user is enabled to execute an application at a client. For example, as shown in FIG. 12, application 512 may be invoked by a user 1220 and executed at client computer system 102. Application 512 may be executed as a desktop application, may be executed in a web browser, or may be executed at client computer system 102 in any other manner. Application 512 may be transmitted to client computer system 102 upon execution, or may have been previously installed. Client-side rules engine 1204 may be provided to client computer system 102 with application 512 (e.g., in an application package), or may be provided separately.

Figure 13:
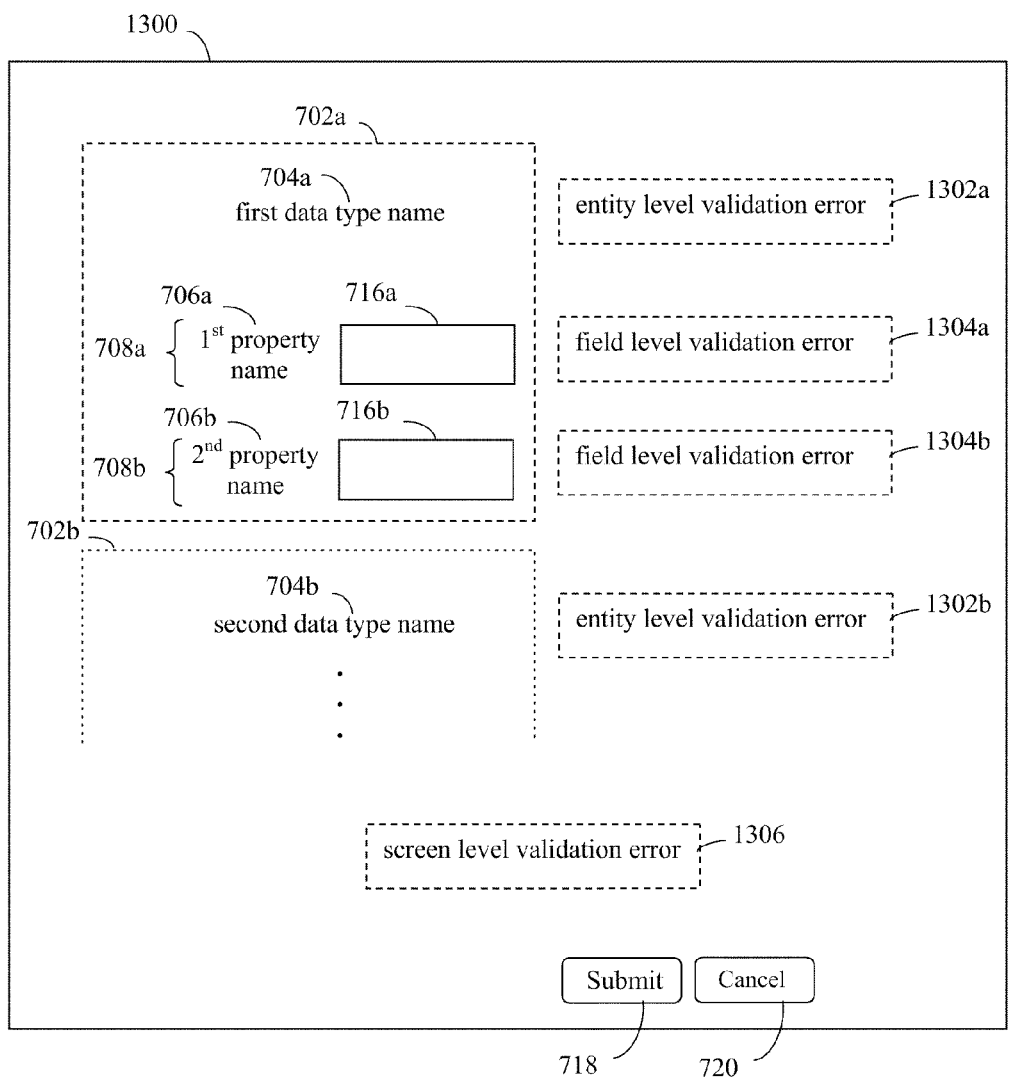
FIG. 13 shows a display screen during application execution, according to an example embodiment.

In step 1104, a display screen of the application is displayed at the client that includes a user interface element capable of receiving data from the user. Application 512 may generate one or more display screens for display at client computer system 102 with which user 1220 may interact. The display screens may include user interfaces for receiving data from user 1220. For instance, display screen 700, which was configured by developer 502, as described above, may be displayed as a display screen 1300, as shown in FIG. 13. As shown in FIG. 13, display screen 1300 includes first entity region 702a for receiving data corresponding to a first entity, and second entity region 702b for receiving data corresponding to a second entity. First entity region 702a includes first and second entity field regions 708a and 708b. First and second entity field regions 708a and 708b include text entry boxes 716a and 716b, respectively, as user interface elements or controls for receiving data from user 1220.

Figure 14:
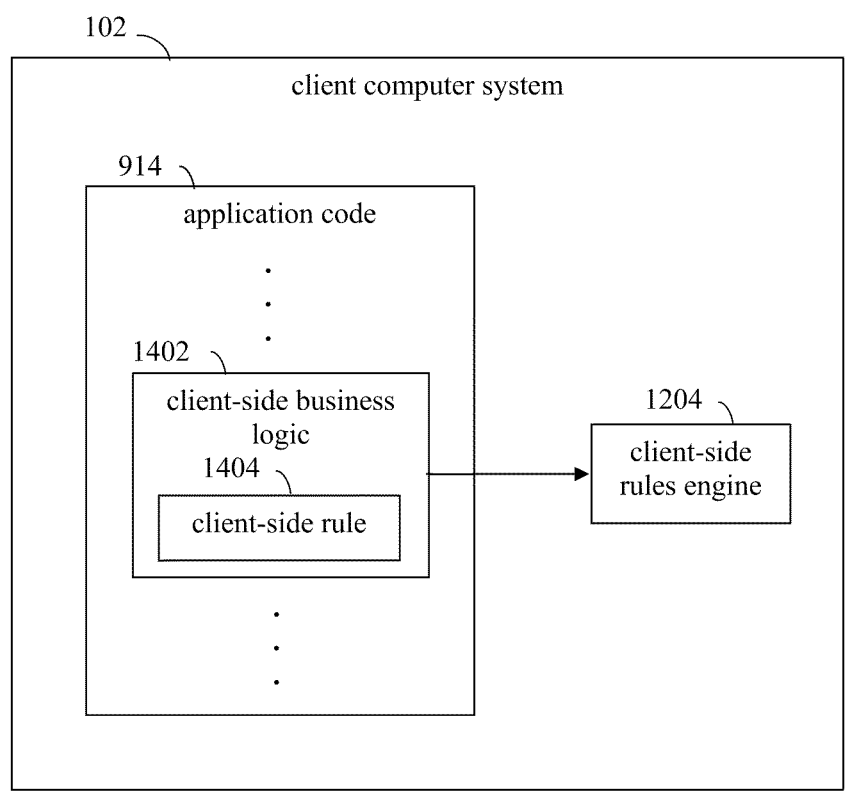
FIG. 14 shows a block diagram of a client computer system, according to an example embodiment.

In step 1106, a first validation is performed at the client of data received by the user interface element according to a client-side rule. For example, user 1220 may have entered data into text entry box 716a of entity field region 708a in FIG. 13. A validation rule may be triggered by entering the data into text entry box 716a, including an entity-level validation rule, an entity-field-level validation rule, and/or a screen level validation rule. As such, client-side rules engine 1204 may perform a validation according to the validation rule. For instance, FIG. 14 shows a block diagram of client computer system 102, according to an example embodiment. In the example of FIG. 14, client-side business logic 1402 implements a client-side rule 1404 associated with text entry box 716a. Client-side business logic 1402 is encountered in application code 914 (in a position in application code 914 that may have been selected as described above), and is provided to client-side rules engine 1204. Client-side rules engine 1204 is configured to perform rule validations at client computer system 102 according to client-side rules, including evaluating client-side rule 1404 associated with text entry box 716a.

In step 1108, a validation error is displayed in the display screen if the data received from the user does not validate according to the client-side rule. Client-side rules engine 1204 executes business logic associated with the client-side rules to validate entities, entity fields, and display screens according to validation rules. In the example of FIG. 14, client-side rules engine 1204 evaluates the data entered into text entry box 716 according to client-side business logic 1402. If client-side rules engine 1204 determines the data does not validate, client-side rules engine 1204 may generate a validation error, which may be displayed in display screen 1300. Furthermore, in an embodiment, validation warnings and/or further validation information may be displayed in display screen 1300, depending on the configuration of the particular validation rule.

For example, as shown in FIG. 13, regions are present in display screen 1300 for display of validation errors. Entity level validation errors 1302 may be displayed corresponding to entity regions 702, entity field-level validation errors 1304 may be displayed corresponding to entity field regions 708, and screen-level validation errors 1306 may be displayed corresponding to display screen 1300. Validation errors 1302 and 1304 may be displayed adjacent to their respective entity regions 702 and entity field regions 708, or in other locations in display screen 1300. Screen level validation errors 1306 may be displayed anywhere in display screen 1300, including in a predetermined screen location for such errors. For example, in an embodiment, all validation errors (e.g., entity level, entity field-level, and screen level validation errors) may be displayed at the bottom of display screen 1300. Furthermore, validation warnings and/or further validation information may be displayed in display screen 1300, including in the regions described above for displaying validation errors.

If a validation error is received, user 1220 may re-enter or change entered data to correct the validation error, which may retrigger validation according to the corresponding validation rule (and/or other validation rules) by client-side rules engine 1204. A validation error may again occur, needing to be corrected, or the re-entered or changed data may pass validation. Note that if no validation error occurs, if validation warnings (e.g., for minor issues) are displayed, or a prior validation error is corrected, a "validation successful" or similar message may be displayed in display screen 1300. Such validation successful or similar messages may be displayed in display screen 1300, including in the regions described above for displaying validation errors.

Furthermore, note that in step 1108, in an alternative embodiment, the entered data may be transmitted to server-side rules engine 1208 to perform validation of the data according to server-side business logic 514 rather than by client-side rules engine 1204. For example, the validation rule may require remote data/resources not accessible at client computer system 102, or may be too complex for evaluation at client computer system 102. In such case, the data may be transmitted to server 106, and server-side business logic 514 may perform the validation. The results of the validation may be transmitted back to client computer system 102, and displayed in display screen 1300.

In step 1110, the user is enabled to interact with the display screen to attempt to save the data if the data received from the user validates according to the client-side rule. Once all desired data has been entered into the display screen, user 1220 may attempt to save the entered data (e.g., by selecting save button 718). Note that the data may not be actually saved into database 206 until further validation occurs, as described as follows. Furthermore, note that in an embodiment, a "save policy" may be specified by developer 502. For instance, by default, display screen 700 may not enable entered data to be saved if there are invalid entities. However, developer 502 may configure display screen 700 to provide the ability to "save as draft," such that invalid entities may be submitted according to a particular policy. Such a policy may be configured for client and server validation.

In step 1112, the data is transmitted from the client to the server if the user interacts with the display screen to attempt to save the data. For example, as shown in FIG. 12, upon user 1220 attempting to save the data, a data signal 1214 that includes changes to the data (e.g., newly input data, updated data) may be transmitted from client computer system 102 through network 104 to server 106.

Figure 15:
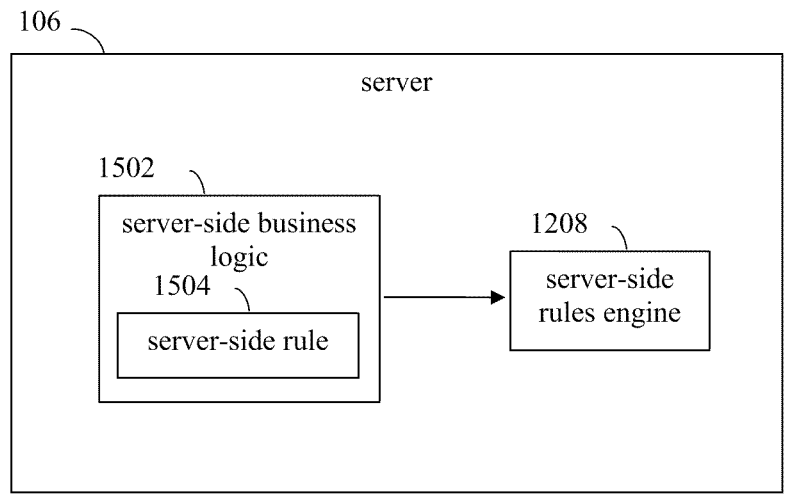
FIG. 15 shows a block diagram of a server, according to an example embodiment.

In step 1114, a second validation is performed at the server of the data according to a server-side rule. In an embodiment, server-side rules engine 1208 may perform a validation of the data received in data signal 1214 according to a server-side validation rule. For instance, FIG. 15 shows a block diagram of server 106, according to an example embodiment. As shown in FIG. 15, server 106 includes server-side business logic 1502 that implements a server-side rule 1504 associated with text entry box 716a. Server-side business logic 1502 is received by server-side rules engine 1208. Server-side rules engine 1208 is configured to perform rule validations at server 106 of received data according to server-side rules, including evaluating server-side rule 1504 associated with text entry box 716a.

Note that in an embodiment, server-side rule 1504 may be the same rule as client-side rule 1404 of FIG. 14, such that the same validation rule is evaluated for the input data at the client-side and the server-side. In another embodiment, server-side rule 1504 may be a different validation rule from client-side rule 1404, even though client-side rule 1404 and server-side rule 1504 may be evaluated for the same data.

In step 1116, a validation error is displayed in the display screen if the data received from the user does not validate according to the server-side rule. For example, if server-side rules engine 1208 evaluates the data entered into text entry box 716 according to server-side business logic 1502, and determines that it does not validate, server-side rules engine 1208 may generate a validation error 1216. As shown in FIG. 12, validation error 1216 is transmitted from server 106 to client computer system 102. Validation error 1216 may be displayed in display screen 1300 in a region corresponding to the entity (e.g., an entity level validation error 1302 in FIG. 13), entity field (e.g., an entity field-level validation error 1304), or display screen (a screen-level validation error 1306) from which the server-side validation was invoked.

If validation error 1216 is received from server 106, user 1220 may re-enter or change the entered data to correct the validation error, which may retrigger validation according to the corresponding validation rule (e.g., and/or further validation rules) by client-side rules engine 1204 and/or server-side rules engine 1208. A validation error may again occur, needing to be corrected, or the re-entered or changed data may pass validation in a similar manner as described above.

In step 1118, the data is persisted into a database accessible at the server if the data received from the user does validate according to the server-side rule. If server-side rules engine 1208 successfully validates the data according to server-side business logic 1502, server 106 may transmit the data as validated data 1218 to database 206. Database 1218 may accordingly store the data (e.g., new data, updated data, etc.)

in storage 208. Database 206 may provide an indication to server 106 that the data was successfully stored, and server 106 may transmit an indication to client computer system 102 that the data was successfully stored (e.g., to indicate that the save attempted in step 1110 was completed).

In this manner, data associated with entities, entity fields, and/or display screens may be validated in a client-server environment. Any number and combination of types of validation rules may be evaluated serially or in parallel according to flowchart 1100. As described above, such validation may occur synchronously (e.g., as data is received in a user interface from a user) or asynchronously. A limitation of conventional validation frameworks is the synchronous nature of rules execution. Often times, conventional validation frameworks require that validation rule be evaluated only when data input is assigned to an entity field as a part of a user's data input process. As such, these rules are evaluated synchronously, and cannot be executed outside of property setters. This does not meet some business application scenarios, where rules need to be executed not just on property setters but by triggers outside of an entity field itself.

Figure 16:
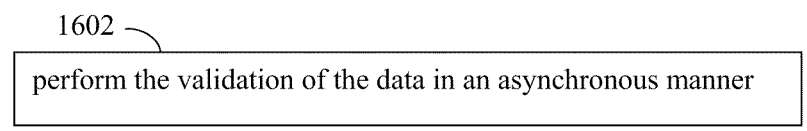
FIG. 16 shows a process for asynchronous validation of data, according to an example embodiment.

In embodiments, validation rules are enabled to be evaluated and results to be generated asynchronously. For instance, in an embodiment, client-side rules engine 1204 and server-side rules engine 1208 may be configured to perform step 1602 shown in FIG. 16. In step 1602, the validation of the data is performed in an asynchronous manner. For example, a validation results property may be used to collect validation results from asynchronous validation execution. Normal property setter based validation rules may be aggregated separately from the validation results property. Asynchronous validation rule execution may be enabled by treating validation rules as a part of view model separate from the display screens of the application. This enables the display screens to be operational regardless of when validation rules are executed. Client-side rules engine 1204 and/or server-side rules engine 1208 may be configured to determine when validation rules need to be evaluated, to execute such validation rules asynchronously, and to post notifications to the corresponding display screen when results are available.

III. Further Example Embodiments

Validation pipeline 302, application development tool 504, user interface configuration module 506, rule configuration module 508, rule placement module 510, rule evaluator 906, rule inserter 908, client-side rules engine 1204, and server-side rules engine 1208 may be implemented in hardware, software, firmware, or any combination thereof. For example, validation pipeline 302, application development tool 504, user interface configuration module 506, rule configuration module 508, rule placement module 510, rule evaluator 906, rule inserter 908, client-side rules engine 1204, and/or server-side rules engine 1208 may be implemented as computer program code configured to be executed in one or more processors. Alternatively, validation pipeline 302, application development tool 504, user interface configuration module 506, rule configuration module 508, rule placement module 510, rule evaluator 906, rule inserter 908, client-side rules engine 1204, and/or server-side rules engine 1208 may be implemented as hardware logic/electrical circuitry.

Figure 17:
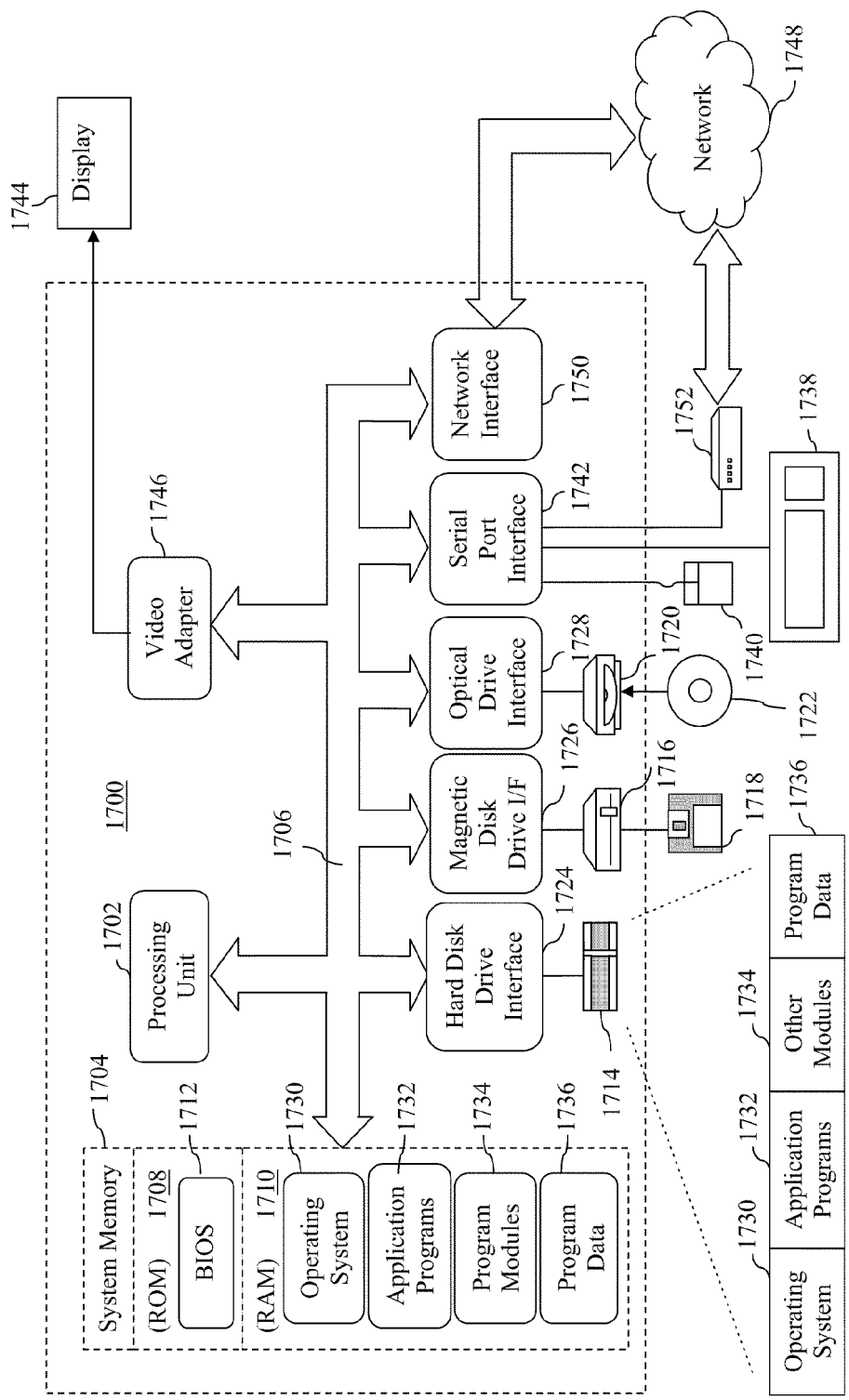
FIG. 17 shows a block diagram of an example computer system that may be used to implement embodiments of the present invention.

FIG. 17 depicts an exemplary implementation of a computer 1700 in which embodiments of the present invention may be implemented. For instance, client computer systems 102 (e.g., client computer systems 102a-102n) and/or server 106 may be implemented similarly to computer 1700, and may include one or more features of computer 1700 and/or alternative features. Computer 1700 may be a general-purpose computing device in the form of a conventional personal computer, a mobile computer, or a workstation, for example, or computer 1700 may be a special purpose computing device. The description of computer 1700 provided herein is provided for purposes of illustration, and is not intended to be limiting. Embodiments of the present invention may be implemented in further types of computer systems, as would be known to persons skilled in the relevant art(s).

As shown in FIG. 17, computer 1700 includes a processing unit 1702, a system memory 1704, and a bus 1706 that couples various system components including system memory 1704 to processing unit 1702. Bus 1706 represents one or more of any of several types of bus structures, including a memory bus or memory controller, a peripheral bus, an accelerated graphics port, and a processor or local bus using any of a variety of bus architectures. System memory 1704 includes read only memory (ROM) 1708 and random access memory (RAM) 1710. A basic input/output system 1712 (BIOS) is stored in ROM 1708.

Computer 1700 also has one or more of the following drives: a hard disk drive 1714 for reading from and writing to a hard disk, a magnetic disk drive 1716 for reading from or writing to a removable magnetic disk 1718, and an optical disk drive 1720 for reading from or writing to a removable optical disk 1722 such as a CD ROM, DVD ROM, or other optical media. Hard disk drive 1714, magnetic disk drive 1716, and optical disk drive 1720 are connected to bus 1706 by a hard disk drive interface 1724, a magnetic disk drive interface 1726, and an optical drive interface 1728, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1730, one or more application programs 1732, other program modules 1734, and program data 1736. Application programs 1732 or program modules 1734 may include, for example, computer program logic for implementing validation pipeline 302, application development tool 504, user interface configuration module 506, rule configuration module 508, rule placement module 510, rule evaluator 906, rule inserter 908, client-side rules engine 1204, server-side rules engine 1208, flowchart 400, flowchart 1000, flowchart 1100, and/or step 1600 (including any step of flowcharts 400, 1000, and/or 1100), and/or any further embodiments as described above.

A user may enter commands and information into the computer 1700 through input devices such as keyboard 1738 and pointing device 1740. Other input devices (not shown) may include a microphone, joystick, game pad, satellite dish, scanner, or the like. These and other input devices are often connected to the processing unit 1702 through a serial port interface 1742 that is coupled to bus 1706, but may be connected by other interfaces, such as a parallel port, game port, or a universal serial bus (USB).

A monitor 1744 or other type of display device is also connected to bus 1706 via an interface, such as a video adapter 1746. In addition to the monitor, computer 1700 may include other peripheral output devices (not shown) such as speakers and printers.

Computer 1700 is connected to a network 1748 (e.g., the Internet) through a network adaptor or interface 1750, a modem 1752, or other means for establishing communications over the network. Modem 1752, which may be internal or external, is connected to bus 1706 via serial port interface 1742.

As used herein, the terms "computer program medium" and "computer-readable medium" are used to generally refer to media such as the hard disk associated with hard disk drive 1714, removable magnetic disk 1718, removable optical disk 1722, as well as other media such as flash memory cards, digital video disks, random access memories (RAMs), read only memories (ROM), and the like.

As noted above, computer programs and modules (including application programs 1732 and other program modules 1734) may be stored on the hard disk, magnetic disk, optical disk, ROM, or RAM. Such computer programs may also be received via network interface 1750 or serial port interface 1742. Such computer programs, when executed or loaded by an application, enable computer 1700 to implement features of embodiments of the present invention discussed herein. Accordingly, such computer programs represent controllers of the computer 1700.

The invention is also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

IV. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method, comprising:
    enabling a user to execute an application at a client;
    displaying a display screen of the application at the client that includes a user interface element capable of receiving data from the user;
    performing, in an asynchronous manner, a first validation at the client of data received by the user interface element according to a client-side rule;
    displaying a validation error in the display screen if the data received from the user does not validate according to the client-side rule;
    enabling the user to interact with the display screen to attempt to save the data if the data received from the user validates according to the client-side rule;
    transmitting the data from the client to the server if the user interacts with the display screen to attempt to save the data;
    displaying a validation error in the display screen in response to a failure of the data to validate at the server according to a server-side rule that corresponds to the client-side rule; and
    persisting the data into a database accessible at the server in response to a success of the data to validate at the server according to the server-side rule.

2. The method of claim 1, wherein the user interface element is configured to enable the user to perform at least one of inputting new data to the database, updating data stored in the database, or deleting data stored at the database.

3. The method of claim 1, wherein said performing a first validation at the client of data received by the user interface element according to a client-side rule comprises:
    executing client-side business logic at the client that is configured to validate the data according to the client-side rule.

4. The method of claim 3, wherein the server-side rule performs the validation of the data at the server by executing server-side business logic at the server that is configured to validate the data according to the server-side rule.

5. The method of claim 1, further comprising:
    displaying a validation error in the display screen in response to failure of the data to validate at the server according to a second server-side rule that does not correspond to any client-side rule; and
    wherein said persisting comprises:
    persisting the data into the database accessible at the server if the data validates at the server according to the first server-side rule and the second server-side rule.

6. A system, comprising:
    an application configured to execute on a client, the application being configured to display a display screen at the client that includes a user interface element capable of receiving data from the user; and
    a first rules engine configured to execute on the client that is configured to perform a first validation at the client of data received by the user interface element according to a client-side rule of the application, the first rules engine being configured to perform the first validation of the data at the client in an asynchronous manner;
    the application is configured to display a validation error in the display screen if the first rules engine indicates that the data does not validate according to the client-side rule;
    the application is configured to enable the user to attempt to save the data if the data received from the user validates according to the client-side rule;
    the data is transmitted from the client to the server if the user attempts to save the data;
    a second rules engine is configured to perform a second validation at the server of the data according to a server-side rule that corresponds to the client-side rule;
    the application is configured to display a validation error in the display screen if the data does not validate according to the server-side rule; and
    the data is persisted into a database accessible at the server if the data does validate according to the server-side rule.

7. The system of claim 6, wherein the user interface element is configured to enable the user to perform at least one of inputting new data to the database, updating data stored in the database, or deleting data stored at the database.

8. The system of claim 6, wherein the first rules engine is configured to execute client-side business logic at the client to validate the data according to the client-side rule.

9. The system of claim 8, wherein the second rules engine is configured to execute server-side business logic at the server that is configured to validate the data according to the server-side rule.

10. A computer-readable storage device comprising computer-executable instructions that, when executed by a processor, perform a method comprising:
   enabling a user to execute an application at a client;
   displaying a display screen of the application at the client that includes a user interface element capable of receiving data from the user;
   performing, in an asynchronous manner, a first validation at the client of data received by the user interface element according to a client-side rule;
   displaying a validation error in the display screen if the data received from the user does not validate according to the client-side rule;
   enabling the user to interact with the display screen to attempt to save the data if the data received from the user validates according to the client-side rule;
   transmitting the data from the client to the server if the user interacts with the display screen to attempt to save the data;
   displaying a validation error in the display screen in response to failure of the data to validate at the server according to a server-side rule that corresponds to the client-side rule; and
   persisting the data into a database accessible at the server in response to validation of the data at the server according to the server-side rule.

11. The computer-readable storage device of claim 10, wherein the user interface element is configured to enable the user to perform at least one of inputting new data to the database, updating data stored in the database, or deleting data stored at the database.

12. The computer-readable storage device of claim 10, wherein said performing a first validation at the client of data received by the user interface element according to a client-side rule comprises:
   executing client-side business logic at the client that is configured to validate the data according to the client-side rule.

13. The computer-readable storage device of claim 10, wherein the method further comprises:
   displaying a validation error in the display screen in response to failure of the data to validate at the server according to a second server-side rule that does not correspond to any client-side rule; and
   wherein said persisting comprises:
      persisting the data into the database accessible at the server if the data validates at the server according to the first server-side rule and the second server-side rule.

14. The system of claim 6, wherein the second rules engine is configured to perform a second validation at the server of the data according to a second server-side rule that does not correspond to any client-side rule;
   the application is configured to display a validation error in the display screen if the data does not validate according to the second server-side rule; and
   the data is persisted into the database accessible at the server if the data does validate according to the first server-side rule and the second server-side rule.

15. A method, comprising:
   enabling a user to execute an application at a client;
   displaying a display screen of the application at the client that includes a user interface element capable of receiving data from the user;
   performing a first validation at the client of data received by the user interface element according to a client-side rule, the client-side rule being an entity-level rule, and the client-side rule determining that data entered into a first field of an entity is correct relative to data entered into a second field of the entity;
   displaying a validation error in the display screen if the data received from the user does not validate according to the client-side rule;
   enabling the user to interact with the display screen to attempt to save the data if the data received from the user validates according to the client-side rule;
   transmitting the data from the client to the server if the user interacts with the display screen to attempt to save the data;
   displaying a validation error in the display screen in response to a failure of the data to validate at the server according to a server-side rule that corresponds to the client-side rule; and
   persisting the data into a database accessible at the server in response to a success of the data to validate at the server according to the server-side rule.

16. The method of claim 1, wherein the client-side rule is a field-level rule, an entity-level rule, or a screen-level rule.

17. A system, comprising:
   an application configured to execute on a client, the application being configured to display a display screen at the client that includes a user interface element capable of receiving data from the user; and
   a first rules engine configured to execute on the client that is configured to perform a first validation at the client of data received by the user interface element according to a client-side rule of the application, the client-side rule being an entity-level rule, and the client-side rule determining that data entered into a first field of an entity is correct relative to data entered into a second field of the entity;
   the application is configured to display a validation error in the display screen if the first rules engine indicates that the data does not validate according to the client-side rule;
   the application is configured to enable the user to attempt to save the data if the data received from the user validates according to the client-side rule;
   the data is transmitted from the client to the server if the user attempts to save the data;
   a second rules engine is configured to perform a second validation at the server of the data according to a server-side rule that corresponds to the client-side rule;
   the application is configured to display a validation error in the display screen if the data does not validate according to the server-side rule; and
   the data is persisted into a database accessible at the server if the data does validate according to the server-side rule.

18. The computer-readable storage device of claim 10, wherein the client-side rule is a field-level rule, an entity-level rule, or a screen-level rule.

19. The system of claim 6, wherein the client-side rule is a field-level rule, an entity-level rule, or a screen-level rule.

20. The method of claim 16, wherein in response to the client-side rule being a screen-level rule, the client-side rule is configured to evaluate data across screen level members to ensure that the display screen as a whole is in a valid state.

* * * * *